FRANK W. BUTLER,
INVENTOR.

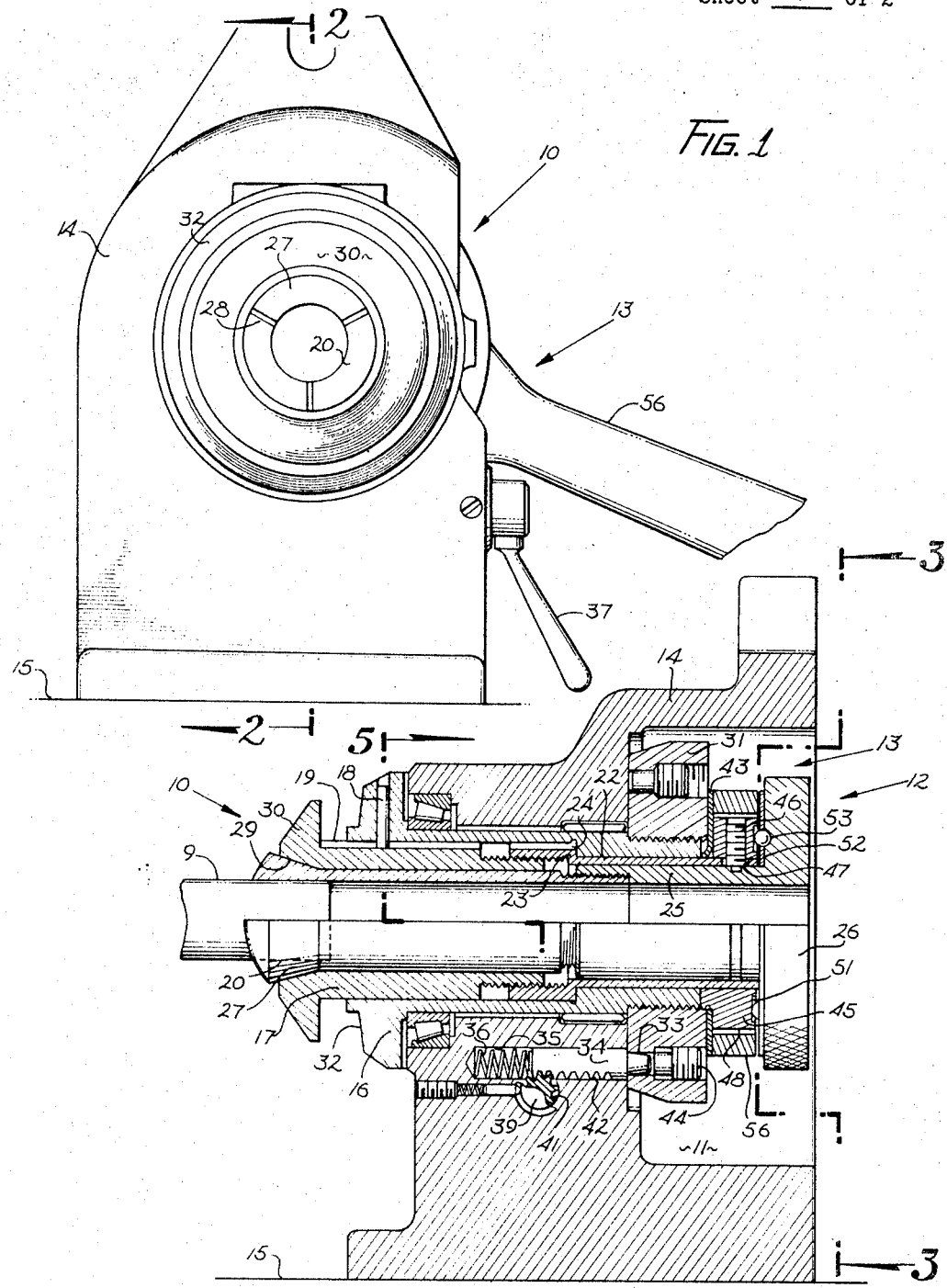

BY R. E. Geangue
ATTORNEY

United States Patent Office 3,451,685
Patented June 24, 1969

3,451,685
COLLET APPARATUS
Frank W. Butler, 10354 Van Alden,
Northridge, Calif. 91324
Filed June 9, 1965, Ser. No. 462,625
Int. Cl. B23b 31/36, 5/34, 5/22
U.S. Cl. 279—5                                   7 Claims

ABSTRACT OF THE DISCLOSURE

A collet apparatus having a ratcheting mechanism accessible at the rear of the collet housing for both operating the work gripping collet structure to grip and release a workpiece and indexing the collet structure in rotation about its central axis to locate the workpiece in a selected angular position.

---

This invention relates to stock or workpiece holders, and more particularly to a collet fixture having a reversible ratchet mechanism for readily indexing stock with respect to a cutting tool and for opening and closing the collet to retain stock or a workpiece therein so that it may be operated upon by a miller, grinder, shaper, drill press and the like machines.

In the machine tool field, it has been the customary and usual practice to employ a stock or workpiece holder for retaining stock to be operated upon by cutting or grinding tools or the like. Generally, the stock or workpiece is held fixed in an adjustable collet or chuck which may be manually opened and closed to effect the insertion or removal of the stock. Furthermore, it has been the conventional practice to employ an indexing mechanism adjacent to the collet and functioning therewith so that a machine operator may readily reference the stock with respect to the cutting tool in the cutting zone. The operator may manually index or position the collet and thereby the workpiece in the cutting zone by proper adjustment of the indexing mechanism such as disclosed in U.S. Letters Patent 2,233,858.

However, difficulties have been encountered when employing collet closing and release mechanisms in combination with indexing mechanisms which stem largely from the fact that the collet closure about the workpiece sometimes becomes jammed and disengagement with the workpiece becomes troublesome. Also indexing mechanisms are generally operated independently of the collet such that there is no relationship between indexing of the workpiece and collet position so that the work remains fixed in the same position with respect to the cutting tool while selecting another index. Furthermore, it is difficult for conventional collet mechanisms in combination with indexing devices to accommodate oversized and undersized parts because of the angle at which the parts are presented to the cutting tool for a given index setting. In some instances, such as disclosed in U.S. Letters Patent 2,233,858, the indexing operating handle is in close proximity to the stock so that odd or irregularly shaped stock may interfere with proper index setting.

The problems and difficulties of the aforementioned conventional collet fixtures are obviated by the device of the present invention in that a reversible ratchet mechanism is provided which cooperatively couples the indexing mechanism with the collet so that the ratchet mechanism can effectively operate to lock and unlock the collet as well as provide for workpiece indexing in the cutting zone relative to the cutting tool. Although the ratchet mechanism may be employed for opening and closing the collet to effect removal of the stock, the collet remains fixed in the same indexed position with respect to the cutting tool so that another piece of stock may be gripped by the collet without disrupting the index setting. The collet is fully adjustable from maximum to minimum with one index setting and, thereby, the invention eliminates the operation of having to place aside or discard oversized or undersized parts. This feature of the invention greatly enhances the yield or work output which a machine operator can produce within a prescribed time period as compared with an operator using conventional equipment.

Therefore, it is an object of the present invention to provide an adjustable collet which will readily accommodate oversized and undersized parts without necessitating a resetting of the index mechanism.

It is another object of the present invention to provide a reversible adjusting mechanism for locking and unlocking the collet about a workpiece and which is adapted to selectively operate the indexing mechanism when desired.

Still a further object of the present invention is to provide a collet indexing fixture which may be operated by a reversible collet opening and closing mechanism whereby the workpiece can be quickly and accurately set to any desired position in the cutting zone with respect to the cutting tool without disengaging the workpiece from the collet.

With these and other objects in view, the invention consists in the novel construction, arrangement and formation of parts, as will be hereinafter more specifically described, claimed and illustrated in the accompanying drawings, in which drawings:

FIGURE 1 is a front elevational view of an improved workholder or collet fixture for holding and indexing a workpiece or solid stock in accordance with the present invention;

FIGURE 2 is a longitudinal sectional view of the collet fixture of FIGURE 1 taken in the direction of arrows 2—2;

Figure 3:
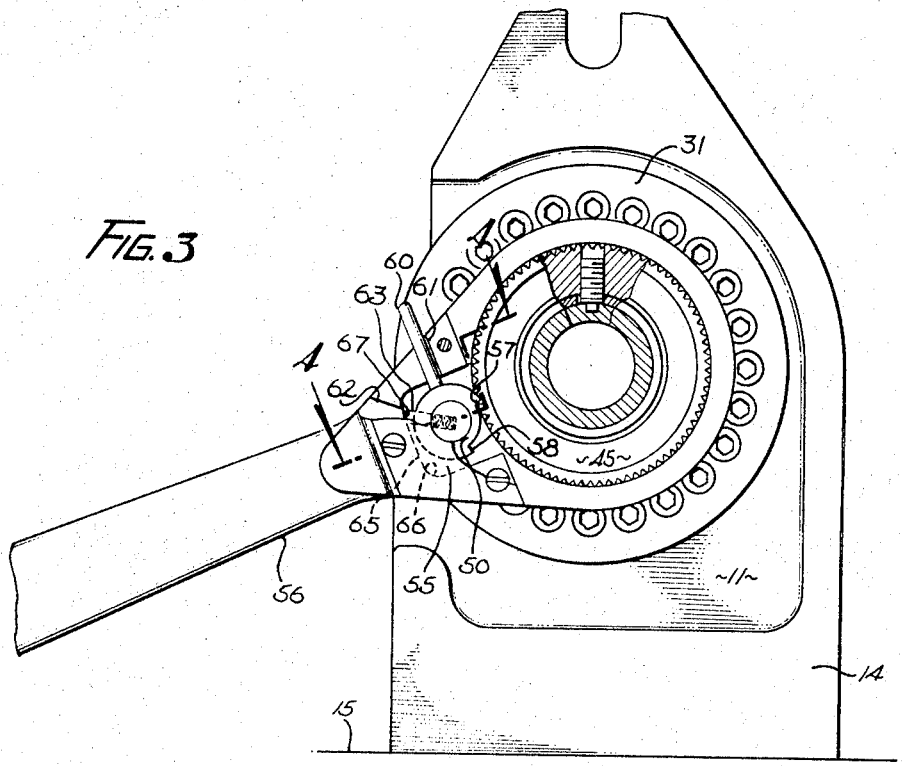
FIGURE 3 is an elevational view of the index dial and the reversible ratchet mechanism for operating collet opening and closure as well as index adjust showing portions of the ratchet mechanism broken away and in section to illustrate structural details taken in the direction of arrows 3—3 of FIGURE 2.

Referring to the drawings wherein similar reference characters designate corresponding parts throughout the several views, a novel collet fixture is generally represented in the direction of arrow 10. The fixture 10 is of a universal character and can be arranged in a horizontal or vertical position upon a bed or table of a metal-working machine. The fixture may conveniently be employed in a headstock of a metal-working machine which may be used for the purposes of milling, grinding, shaping, and the like. The fixture may be mounted on any convenient base or ways and can be used for many different purposes. Bar stock 9 or other workpiece forms may be inserted into and gripped by the collet fixture and retained thereby in the cutting zone while being operated upon by a desired machine tool (not shown).

Indicated in the direction of arrow 12, an index device is shown which cooperates with the collet fixture to position the workpiece with reference to the machine tool in the cutting zone. Disposed between the index device and the collet fixture, there is provided a ratchet mechanism indicated in the direction of arrow 13.

Referring in detail to FIGURES 1 and 2, the collet fixture 10 is shown, which includes a housing 14 mounted upon any suitable type of base 15. Rotatably mounted within housing 14 is a hollow spindle 16 for receiving and supporting an elongated hollow collet sleeve 17. The collet sleeve and the spindle are interconnected by means of a pin 18 projecting in sliding engagement with a slot 19 provided in the sleeve so that the sleeve will turn with the spindle. However, when pin 18 leaves the slot, due to advancement of the collet sleeve to an extreme position away from the housing, spindle rotation is permitted without sleeve rotation. Mounted within the collet sleeve is a preferred type of collet 20. In the present instance, a collet is shown of the type for permitting a workpiece 9 to extend therethrough projecting into the cutting zone so that the workpiece may be operated upon by a desired cutting tool (not shown). The collet sleeve is permitted longitudinal movement within the bore of the spindle but it is not permitted rotational movement independent of the spindle because of the pin and slot arrangements.

The spindle includes a plurality of threads at its reduced end for supporting a part of the index device 12 which is disposed to an enlarged cavity 11 formed in one end of the housing. A ratchet sleeve 22 is rotatably carried in the spindle bore. The ratchet sleeve includes an enlarged portion 23 which operates with a shoulder 24 formed by a reduction in bore diameter in the spindle to retain the ratchet sleeve from longitudinal movement in one direction during its rotation. It can be seen clearly from FIGURE 2 that one end of the collet sleeve is threadably engaged with the enlarged portion 23 end of the ratchet sleeve so that rotation of the ratchet sleeve will cause longitudinal movement of the collet sleeve with respect to the spindle. Furthermore, it is noted that a threaded end of the collet projects into the bore of the ratchet sleeve where the collet 20 is threadably engaged with an index sleeve 25 extending internally into the housing from an index nut 26.

The opposite end of the collet to its threaded end is provided with an enlarged portion 27 having slots, such as slot 28, which engages with an annular cam surface 29 provided in the exposed end 30 of collet sleeve 17 so that longitudinal movement of the collet sleeve will apply more or less pressure to the enlarged portion of the collet causing the collet to open and close about the workpiece.

The rear end of the spindle extends through the housing 14 into cavity 11 and is shown threadably engaged by an index dial 31. In this fashion, the spindle is rotatably maintained in the housing 14 by the index dial on one end and an enlarged annular flange 32 on its opposite end. The index dial turns with the spindle, and, in fact, the index dial can be utilized for rotating the spindle when desired. The dial is provided with a predetermined number of openings 33 for receiving a sliding index pin or plunger 34. Any number of holes or openings may be provided in the index dial to provide for given divisions or degrees of space. The index pin or plunger is slidably mounted within a bore 35 formed in the housing and the plunger is normally urged by an expansion spring 36 toward the index dial so that the plunger will automatically enter a selected opening.

Figure 5:
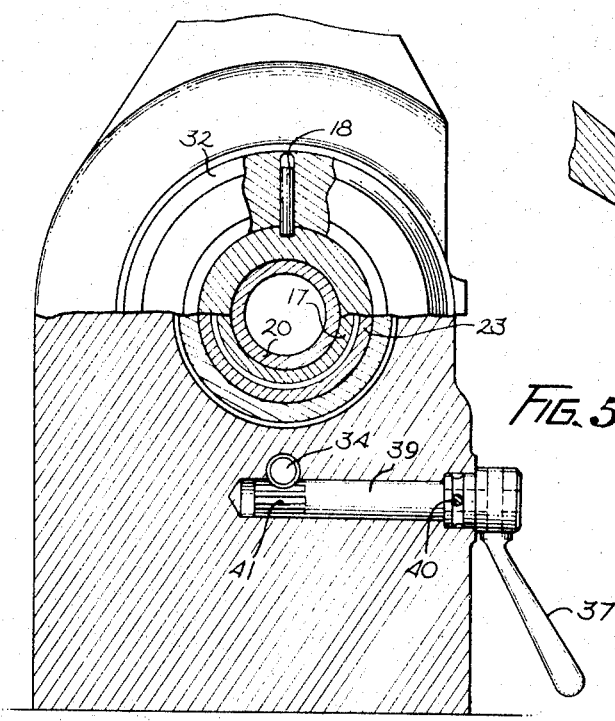
FIGURE 5 is a sectional view of the collet fixture of FIGURE 2 taken in the direction of arrows 5—5.

As shown more clearly in FIGURE 5, lever 37 can be employed for retracting the plunger. The lever is secured to a shaft 39 rotatably mounted in housing 14 by means of a pin 40. The end of the shaft opposite to its end carrying the handle has formed thereon a pinion 41 for engaging a rack 42 formed on one edge of the pin or plunger.

In order to insure the retention of the index dial on the spindle, the rear end of the ratchet sleeve may be employed for mounting a retainer washer 43. To prevent the turning of the washer with respect to the index dial, the washer is shown as a press set over the end of the ratchet sleeve. Such construction permits the index dial and the spindle to rotate for an indexing operation while allowing for ratchet sleeve rotation to open and close the collet while the spindle and index dial remain in fixed position with respect to the housing due to the insertion of the plunger in a selected opening of the index dial.

When the plunger or index pin is retracted against the turn of the expansion spring the index dial and spindle can be turned, but, obviously, as soon as the plunger is released and enters one of the openings in the index dial, further rotating movement of the spindle and thereby the collet is prevented.

In order to insure the entrance of the plunger or pin in a desired opening, the openings 33 have their walls enlarged and internally threaded to receive threaded plug or pin 44. The forward ends of the pins are reduced in diameter so that the pins can enter easily into the inner reduced ends of the openings. When the plugs are turned, by any suitable tool, into the openings, the shoulders formed on the pins are frictionally bound against annular shoulders in the walls of the openings formed by the enlargement of the openings, and hence, displacement of the set screws or plugs from their operating position will be prevented.

A part of the washer 43 extends over the outer ends of the openings, and thus when the set screws or plugs are threaded out to their unoperative positions, the same will bind tight against the washer, and thus, the set screws or plugs will be prevented from working loose when the same are in their operative position.

In FIGURE 2, the entrance or insertion of the plunger into the index plate opening at the top of the plate, as shown, is prevented by the plug whereas the plunger is received into the opening at the bottom of the plate since the plug has been set to accommodate plunger insertion.

For precise control over indexing as well as for collet opening and closing, a ratchet gear or ring 45 is provided on the end of ratchet sleeve 22 in the housing cavity 11 which is arranged to rotate the sleeve 22 by means of a set screw 46 carried by the gear projecting through aperture 47 in the sleeve. The ratchet ring is provided with an annular bearing surface 51 on its side for receiving a ball bearing assembly consisting of a race 52 for holding a plurality of ball bearings, such as ball 53, mounted on the inside face of the index nut 26. Construction in this manner permits the ratchet ring to rotate relative to the index dial when the plunger is inserted into a selected index dial opening so that collet actuation may be effected without change of workpiece indexing.

Figure 4:
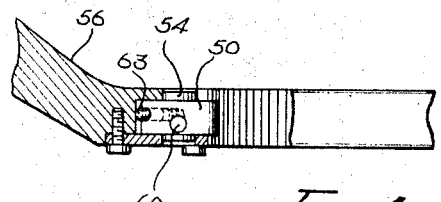
FIGURE 4 is a sectional view of the ratchet mechanism taken in the direction of arrows 4—4 of FIGURE 3.

A plurality of ratchet teeth, such as tooth 48, are formed about the outer periphery of the ring which are engaged by a spring-biased pawl 50 as shown in FIGURES 3 and 4. The pawl is rotatably carried on a shaft 54 in a mechanism chamber 55 formed in a ratchet lever 56 which is rotatably mounted over the ratchet ring 45 as shown in FIGURE 3. The pawl includes a pair of opposing teeth 57 and 58 which are selectively engageable with the tooth arrangements on the ratchet ring so as to rotate the ring either in a forward direction or a reverse direction.

Each tooth carried by the pawl is adapted to engage the walls of the ratchet ring teeth and drive the ratchet ring when the lever is turned in one direction and to slide or ratchet over the ring teeth when the lever is turned in a reverse direction. In FIG. 3, for example, the pawl is set to drive the ratchet ring in the counter-clockwise direction. The turning of the lever can be limited by interference with a portion of the housing, which can be arranged in the path of a part of the lever.

Selection of ring rotational direction is effected by positioning of a pin 60 secured on the pawl which projects externally of the lever so that it can be manually set. A pair of opposing stops 61 and 62 are employed for limiting the movement of the pin and thereby the degree of rotation of the pawl. As shown in FIGURE 3, the pin is at rest against stop 61 which causes tooth 57 to engage the ring for forward or counter-clockwise rotation. Conversely, if the pin is at rest against stop 62, pawl tooth 58 would be in engagement with the ring for effecting reverse or clockwise rotation.

To maintain the pawl in either one of its two engaging positions with the ring, it is to be noted that the pawl is provided with a spring biased detent 63 which is slidably mounted in the pawl on the opposite side thereof to the teeth. The detent is urged outwardly beyond the periphery of the pawl by means of an expansion spring and is further provided with a rounded head engageable with a wall 65 partially defining the mechanism chamber 55. The chamber is basically of square or rectangular shape having rounded corners 66 and 67 formed at opposite ends of the wall. When the pin is in the counter-clockwise drive position of FIG. 3, the detent is urged by its spring towards corner 67 and when the pin is in the reverse or clockwise drive position the detent is urged toward the opposite corner 66. Rotation of the pawl by the pin 60 between these two positions causes the detent to ride along the wall 65 and compresses the biasing spring.

Once the pin is in its selected position for forward or reverse movement, the lever 56 may be manually operated to open and close the collet without change of index or the lever may be operated to rotate the collet via the spindle and the index dial for indexing purposes. These two operations, namely collet actuation and indexing, are achieved by movement of the lever dependent upon whether or not the plunger lock is engaged or disengaged with the index dial.

In actual operation, collet actuation for opening and closing is initially achieved by activating lever 37 to permit spring 36 to urge plunger 34 into a selected opening provided in the index dial. The insertion of the plunger will prevent the index dial and the spindle from rotating. Pin 60 associated with the ratchet mechanism, is positioned against stop 61 so that ring 45 rotation will be in a forward or counter-clockwise direction in FIG. 3. This action places tooth 57 of the pawl into engagement with the teeth 48 of the ratchet ring. Detent 63 is spring biased towards corner 67 of the mechanism chamber provided in lever 56 which insures engagement of the pawl tooth with the ring.

Lever 56 is then rotated in a counter-clockwise direction in FIG. 3 which is followed by the ring 45. Inasmuch as ring 45 is engaged with the ratchet sleeve 22 by means of screw 46, the ratchet sleeve will be caused to follow the rotational movement of the ratchet ring. As the ratchet sleeve rotates on its seat within the bore of spindle 16, the collet sleeve 17 is urged outwardly from housing 14 so that its annular cam surface 29 presses against the enlarged end 27 of the collet. This camming action causes the collet to compress as permitted by the slots 28. Rotation of the lever 56 continues in an oscillating motion, the pawl tooth sliding over the teeth of the ring during clockwise stroke of the lever in FIG. 3, until the collet is in a firm gripping relationship with the workpiece 21.

For purposes of indexing the workpiece 21 in the cutting zone, handle 37 is rotated to remove plunger 34 from the opening in which the plunger was inserted in the index dial. This action frees the index dial and the spindle 16 from its previously fixed position with respect to the housing so that rotation may occur. The handle 56 can now be rotated in either direction in FIG. 3 as determined by the positioning of the pawl. As the lever 56 is actuated, ratchet ring 45 rotates the ratchet sleeve 22. Inasmuch as the collet sleeve 17 and the spindle 16 as well as the index dial 31 are mounted on the ratchet sleeve, these elements will follow the rotational movement of the ratchet ring. Also, since the collet sleeve is in gripping engagement with the collet, and, in turn, the collet in gripping engagement with the workpiece 21, the workpiece will follow the rotation initiated by the positioning or movement of lever 56. When the workpiece 21 has been positioned to a selected location in the cutting zone, handle 37 may be released so that spring 36 will urge plunger 34 to enter an opening in the index dial.

In the event no opening is available because of blockage caused by the setting of screw 44, the screw may be rotated outwardly so the opening is not obstructed.

To effect collet opening so that its grip is released on the workpiece for removal of the workpiece, the above described procedure for closing the collet about the workpiece 21 may be reversed. Namely, pin 60 of the pawl is positioned against stop 62 so that tooth 58 of the pawl engages with the tooth of the ring. Thereupon, rotation of the ring is in a clockwise direction in FIG. 3 so that the collet sleeve 17 is drawn away from the enlarged portion of the collet and the collet's grip on the workpiece is released.

An additional feature of the present invention resides in the capabilities of the collet to be indexed by actuating handle 37 to remove the plunger from insertion in an opening in the index dial and by manually rotating the index nut 26 in either a clockwise or counterclockwise direction. Such action causes the spindle and index dial to rotate as well as the collet and collet sleeve without releasing or increasing the collet grip on the workpiece.

Therefore, it can be seen from the foregoing description of the device of the present invention as well as its operational aspects, that collet gripping actuation as well as collet indexing is readily achieved by a convenient and easily adjusted hand lever action. Also, the device is flexible with respect to indexing inasmuch as this operation may also be achieved by manual rotation of the index nut. A feature of the invention resides in the fact that the handle 37 and hand lever 56 are located on the housing 14 away from the collet so that the form or shape of the workpiece held by the collet will not interfere with the adjustment or indexing of the collet operating mechanism.

While the particular collet fixture herein shown and described in detail is fully capable of attaining the objects and providing the advantages hereinbefore stated, it is to be understood that the particular configuration is merely illustrative of the presently preferred embodiment of the invention and that no limitations are intended to the details of construction or design herein shown other than as defined in the appended claims.

What is claimed is:

1. A collet fixture comprising:
   a housing;
   a tubular axially fixed spindle rotatable in said housing and having front and rear ends;
   a collet within the front end of and rotatable with said spindle;
   a collet sleeve slidably mounted in and keyed against rotation relative to said spindle for contracting said collet;
   an index dial fitted on the rear end of said spindle;
   locking means on said housing engageable with said index dial for holding said index dial, spindle, and collet in any desired position including a lever adjacent the rear end of said spindle for operating said locking means; and
   adjustment means operably coupled to said spindle and said collet sleeve for selectively indexing said collet and for operating the opening and closure of said collet independent of indexing by said index dial including a member extending through the rear end of said spindle and threadedly joined to said collet sleeve, and a combined collet operating and indexing handle at the rear end of said spindle operatively connected to said member and spindle for rotating said spindle and member in unison to index said collet when said locking means is disengaged from said index dial and rotating said member relative to said spindle to open and close said collet when said locking means engages said index dial.

2. A collet fixture comprising:
   a housing;

a tubular axially fixed spindle rotatable in said housing and having front and rear ends;

a collet within the front end of and rotatable with said spindle;

a collet sleeve slidably mounted in said spindle for contracting said collet and having an elongated slot provided on its external surface;

a pin secured to said spindle projecting into said sleeve slot;

an index dial fitted on the rear end of said spindle and having a plurality of index openings therein;

indexing means on said housing cooperating with said index dial openings for holding said index dial, spindle, and collet in any desired position including a lever adjacent the rear end of said spindle for operating said indexing means; and adjustment means operably coupled to said spindle adjacent said index dial and said collet sleeve for selectively indexing said collet and for operating the opening and closure of said collet when said aforementioned means holds said index dial including a member extending through the rear end of said spindle and threadedly joined to said collet sleeve, and a combined collet operating and indexing handle at the rear end of said spindle operatively connected to said member and spindle for rotating said spindle and member in unison to index said collet when said indexing means is disengaged from said index dial and rotating said member relative to said spindle to open and close said collet when said locking means engages said index dial.

3. A collet fixture comprising:

a housing;

a spindle rotatably mounted in said housing;

a collet sleeve slidably carried on said spindle;

a collet mounted in said collet sleeve;

an index dial secured to one end of said spindle;

a ratchet sleeve rotatably supporting said spindle;

one end of said ratchet sleeve threadably connected to one end of said collet sleeve;

a flanged index nut mounted through the other end of said ratchet sleeve and having one end thereof secured to one end of said collet;

locking means mounted in said housing releasably engageable with said index dial;

means coupling said collet sleeve to said spindle to permit longitudinal displacement of said collet sleeve responsive to ratchet sleeve rotating when said locking means is engaged with said index dial;

a ratchet mechanism secured to the other end of said ratchet sleeve for rotatably actuating said ratchet sleeve.

4. The invention as defined in claim 3 wherein said indexing by the ratchet mechanism occurs when said locking means is disengaged from said housing to permit index dial and spindle rotation responsive to ratchet mechanism rotation.

5. A collet fixture comprising:

a housing:

a collet assembly in said housing adapted to open and close about a workpiece including an axially fixed tubular spindle rotatable in said housing, collet means within one end of said spindle having a collet operating member slidable in and fixed against rotation relative to said spindle for opening and closing said collet means to grip and release a workpiece upon axial movement of said member, and a ratcheting member rotatable within and fixed against axial movement relative to the other end of said spindle and threadedly coupled to said collet operating member whereby rotation of said ratcheting member with said spindle fixed against rotation moves said collet operating member axially and rotation of said ratcheting member with said spindle released for rotation rotates said collet assembly relative to said housing;

locking means mounted in said housing and being releasably engageable with said spindle to secure said spindle against rotation relative to said housing; and ratchet mechanism coupled to said ratchet member to rotate the latter and thereby said collet assembly when said locking means are disengaged and to open and close said collet means about the workpiece when said locking means are engaged.

6. The invention as defined in claim 5 wherein said ratchet mechanism is reversible and includes:

a ratchet gear fixed to said ratchet member:

a handle carried on said gear;

a pawl pivotally mounted on said handle having a pair of teeth selectively engageable with said gear to reverse the ratcheting direction of said ratchet mechanism; and means attached to said pawl for pivoting said pawl so as to engage either tooth of said pair with said gear.

7. A collet fixture according to claim 5 wherein:

said spindle has an index dial about said other spindle end engageable by said locking means, said collet operating member comprises a collet sleeve, said ratcheting member comprises a ratcheting sleeve threadedly connected at one end to said collet sleeve, said collet means further comprises a collet within said collet sleeve, coacting means on said collet and collet sleeve whereby axial movement of said collet sleeve opens and closes said collet, an index sleeve secured to said collet, and a shoulder on said index sleeve beyond the other end of said ratcheting sleeve in spaced confronting relation to said index dial, and said ratchet mechanism is coupled to said ratchet sleeve between said dial and shoulder.

References Cited

UNITED STATES PATENTS

| 1,868,839 | 7/1932 | McNaught | 81—63 |
| 2,429,617 | 10/1947 | Gustafson | 279—5 |
| 3,090,633 | 5/1963 | Farnsworth | 279—5 |
| 3,273,907 | 9/1966 | Vodergerg | 279—5 |

ROBERT C. RIORDAN, Primary Examiner.

R. V. PARKER, JR., Assistant Examiner.

U.S. Cl. X.R.

269—70